US006907237B1

(12) United States Patent
Dorenbosch et al.

(10) Patent No.: US 6,907,237 B1
(45) Date of Patent: Jun. 14, 2005

(54) COMMUNICATION SYSTEM THAT PROVIDES BACKUP COMMUNICATION SERVICES TO A PLURALITY OF COMMUNICATION DEVICES

(75) Inventors: Jheroen P. Dorenbosch, Paradise, TX (US); Lynette J. Lobo, North York (CA)

(73) Assignee: Motorola, Inc., Schaumburg, IL (US)

( * ) Notice: Subject to any disclaimer, the term of this patent is extended or adjusted under 35 U.S.C. 154(b) by 524 days.

(21) Appl. No.: 09/650,118

(22) Filed: Aug. 28, 2000

(51) Int. Cl.[7] .............................................. H04M 11/04
(52) U.S. Cl. ..................... 455/404.1; 455/423; 455/424; 455/453
(58) Field of Search ................................ 455/404, 423, 455/424, 425, 527, 453, 446, 404.1

(56) References Cited

U.S. PATENT DOCUMENTS 5,742,904 A * 4/1998 Pinder et al. ............... 455/404
6,192,232 B1 * 2/2001 Iseyama ...................... 455/404
6,374,099 B1 * 4/2002 Bi et al. ...................... 455/404
6,408,182 B1 * 6/2002 Davidson et al. ........... 455/424

* cited by examiner

Primary Examiner—William Trost
Assistant Examiner—Stephen M. D'Agosta
(74) Attorney, Agent, or Firm—Hisashi D. Watanabe

(57) ABSTRACT

A communication system that provides communication services to a plurality of communication devices over one or more wireless channels. The communication system includes a main system component that normally serves all of the plurality of communication devices. However, when the main system component goes out of service, a backup system component only serves some of the communication devices. As such, backup service is provided in accordance with the service priority as subscribed by the communication devices.

16 Claims, 3 Drawing Sheets

COMMUNICATION SYSTEM THAT PROVIDES BACKUP COMMUNICATION SERVICES TO A PLURALITY OF COMMUNICATION DEVICES

FIELD OF THE INVENTION

In general, the present invention relates to the field of communication systems, more particularly, to a communication system that provides backup communication services to a plurality of wireless communication devices.

BACKGROUND OF THE INVENTION

In today's point-to-point communications, wireless communication systems may provide some advantages over conventional systems. The communication systems provide efficient allocation of limited communication resources, for example, radio frequency (RF) channels, to a large number of subscribers that use the communication devices, such as mobile or portable radios, for purposes of various communication services. Additionally, many system features, such as channel privacy, user identification, etc., can be incorporated into such systems.

In a wireless communication system, a plurality of communication devices communicate voice and data messages via one or more base stations that provide the air interface and radio link to the communication devices. A communication resource controller is responsible for allocation of the RF channels and other system resources. Generally, the resource controller controls the type of information transmitted to the communication devices. For example, control messages may be communicated over control channels, and voice and data messages may be communicated over voice or data (also known as traffic) channels. The resource controller, upon reception of an inbound channel request from one of the communication devices or when the communication device is being called, allocates the available resources to the requesting communication device.

In some communication system, such as trunked systems among others, the availability of system resources impacts access latency to the communication services. That is, when the communication resources are fully utilized, the subsequent communication devices that request service access are placed in queue until the system resources become available again. It is known to provide service access based on service priority associated with various subscribers. For example, subscribers with a higher service priority are advanced through the queue faster than subscribers with lower service priority.

In order to provide reliable and uninterrupted communication service, some system operators provide a backup communication infrastructure. Under this arrangement, when a main system component goes out of service, a backup system component provides uninterrupted backup communication service. Generally, such backup service is provided to the entire fleets or groups of communication devices, irrespective of the service priority associated with the subscribers. In order to provide the backup service to all of the communication devices, the existing infrastructures use the exact replica of the main components for the backup components. Replicating exactly the main and backup system components throughout the system, however, leads to a very costly infrastructure in which some subscribers may be reluctant to pay for higher service fees, specially those subscribers that require the lower priority services.

Accordingly, there exists a need to provide cost-effective backup communication infrastructure in view of the service requirements of the subscribers.

DETAILED DESCRIPTION OF THE PREFERRED EMBODIMENT

Figure 1:
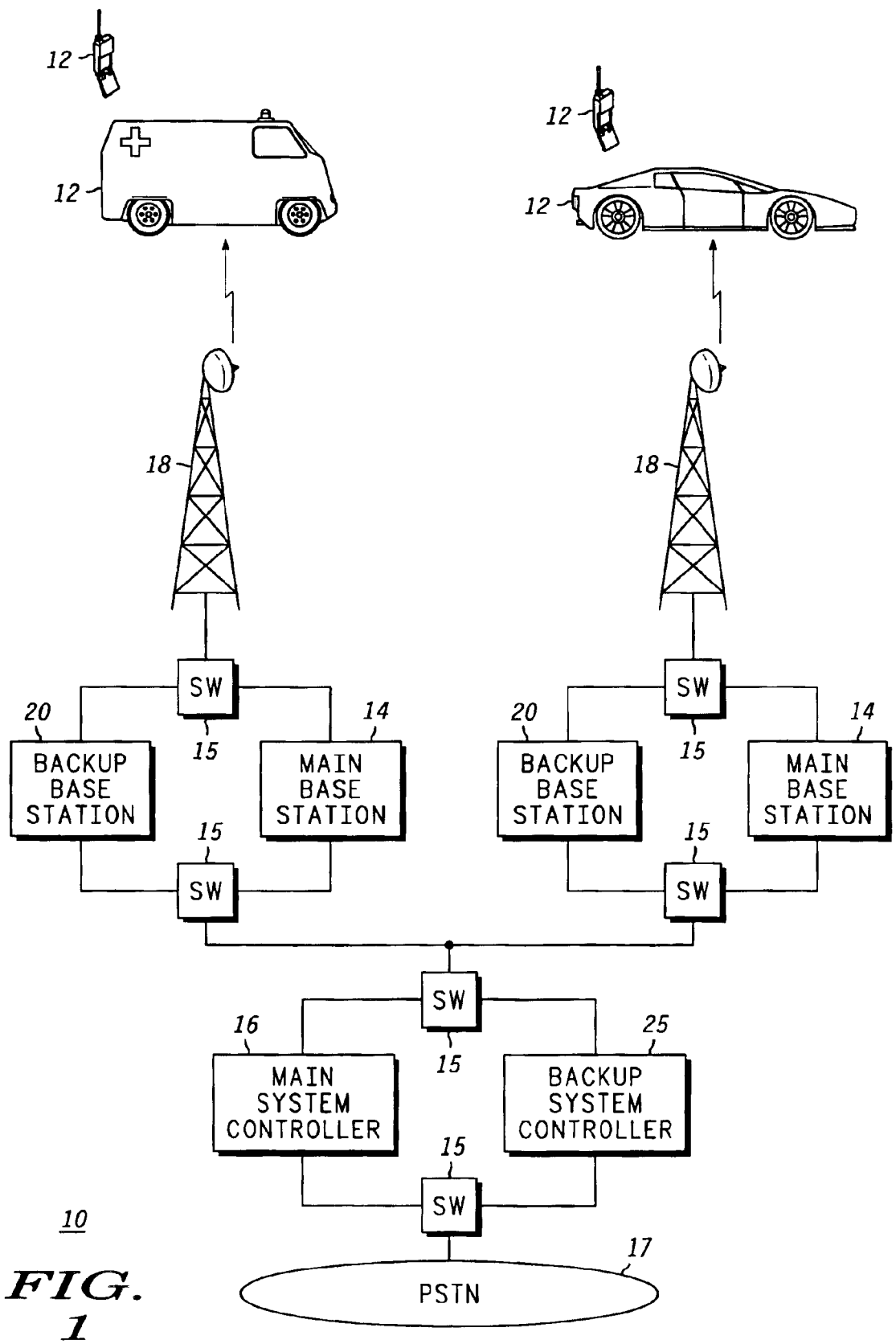
FIG. 1 illustrates a communication system in accordance with the present invention.

The present disclosure relates to a communication system that provides communication services to communication devices over wireless channels. The communication system includes a resource controller that provides communication resources to various system components, including one or more base stations and system controllers. The communication devices can subscribe to different classes of service priorities. For examples, some of the communication devices can be subscribed to a first class of service with higher service priorities, such as emergency services, and other communication devices, dependent upon for example, subscribed to a second class of service with lower service priorities, such as non-emergency services.

In accordance with the invention, during normal operation, the system provides communication service to all of the communication devices, irrespective of the service priority associated with a communication device. However, when one or more main system components go out of service, for example, due to a fault condition or for maintenance, the system provides backup service in accordance with a class of service associated with the communication devices. For example, some but not all of the communication devices subscribed to a class of service can receive backup communication services. In this way, the system provides backup service to communication devices that are subscribed to a first class of service priority, but terminates service to communication devices that are subscribed to a second class of service priority. In an exemplary embodiment, the communication devices that are subscribed to a higher service priority, for example, communication devices belonging to an emergency fleet, receive communication service irrespective of a fault condition.

As such, the main system component serves all of the communication devices, irrespective of service class, while the back system component can serve some but not all of the communication devices. In other words, the communication system provides communication service to communication devices that are subscribed to a lower service priority under normal operating conditions, but not all of such communication devices may receive backup communication service. Consequently, the backup system components can have a lower capacity relative to the main system components, thereby reducing system cost, enabling the system operators to offer communication services commensurate with class of service. System cost can be further reduced using a main system component of normal or moderate reliability and a lower capacity backup system component with high reliability.

According to some of the more detailed features of the invention, the main and backup system components can be any components that provides a system function. In one embodiment, the main and backup system components can be base stations that provide wireless links between the system and the communication devices. In another embodiment, the main and backup system components can be system controllers that control the operation of the base stations.

For example, if the main base station is out of service, the backup base station serves emergency fleets, but does not serve non-emergency fleets and, when the main system controller fails to operate properly, the communication system switches to a backup system controller.

Referring to FIG. 1, a block diagram of a communication system 10 according to the present invention is shown. The communication system 10 of the exemplary embodiment is a trunked communication system offered by Motorola Inc., the assignee of the present invention. The system 10 includes various system components, such as base stations, systems controllers, etc. The detailed specifics of the operation of trunked systems are well known. Therefore, the present invention is described herein only to the extent necessary for enabling one skilled in the art to make and use the invention. Moreover, although the description of the exemplary embodiment(s) relate to a trunked system, the present invention is equally applicable to various other wireless system embodiments, such as land mobile systems, cellular systems (e.g., GSM, IS-136, IS-95, iDen) personal communication systems (e.g., Bluetooth, GPRS, UMTS, G 2.0, etc.) and paging systems (e.g., Flex and Reflex).

The system 10 provides communication services to a plurality of communication devices 12. Each communication devices 12 can operate as a single unit or it can operate in a group within an assigned fleet. As shown, some of the communication devices 12 belong to an emergency fleet, such as those associated with ambulances, etc., while others belong to non-emergency fleets. Each emergency fleet communication device has a service classification that provides a higher service priority relative to that offered to a non-emergency fleet communication device.

Normally, a main base stations 14, under the control of a main system controller 16, provide RF links via an antenna 18, to all of the communication devices, irrespective of service classification. The main system controller 16 is responsible for the allocation of resources within the communication system 10, including the allocation of the RF links or channels over which voice and control information are communicated. The main system controller 16 is also responsible for interfacing with other communication networks, such as a public switching telephone network (PSTN) 17. In accordance with the present invention, if the main base station 14 malfunctions or otherwise goes out of service, a backup base station 20, possibly with a lower capacity than the main base station 14, can serve some, but probably not all of the of the communication devices 12, in accordance with a class of service to which the communication devices are subscribed to. In another embodiment of the invention, the main system controller 16 has an associated backup system controller 25. The backup system controller 26 may have a smaller capacity than that of the main system controller 14. The backup system controller 26 provides communication service to the communication devices 12 that subscribe to the first or higher class of service in the event of the main system controller 14 is out of service. As shown, switches 15 switch a main system component to a backup system component and vice versa.

For example, the backup station 20 can only serve the communication devices 12 belonging to the higher priority emergency fleet, e.g., a police fleet or an ambulance fleet, etc. For example, in order to save costs, the backup station 20 may only support a fraction of the channels supported by the main base station 14. Based on the lower priority associated with the non-emergency fleets, communication service to communication devices 12 belonging to these fleets are terminated. It should be noted that fleets or groups of the communication devices 12 can be divided into sub-fleets or sub-groups, each having an assigned class of service. Under the present invention, communication service to more than one class of service can be preserved or terminated when a main system component encounters a fault condition or otherwise goes out of service. Depending on the service capacity of the backup system controller 25, service is terminated to those communication devices 12 that do not qualify for the first class of service.

In a well-known manner, the main system controller 16 and the communication devices 12 communicate control messages on a control channel and voice and data messages on a plurality of traffic channels. Based on control information received from the system controller 16, the communication devices 18 use allocated traffic channels to carry voice an data communication.

Figure 2:
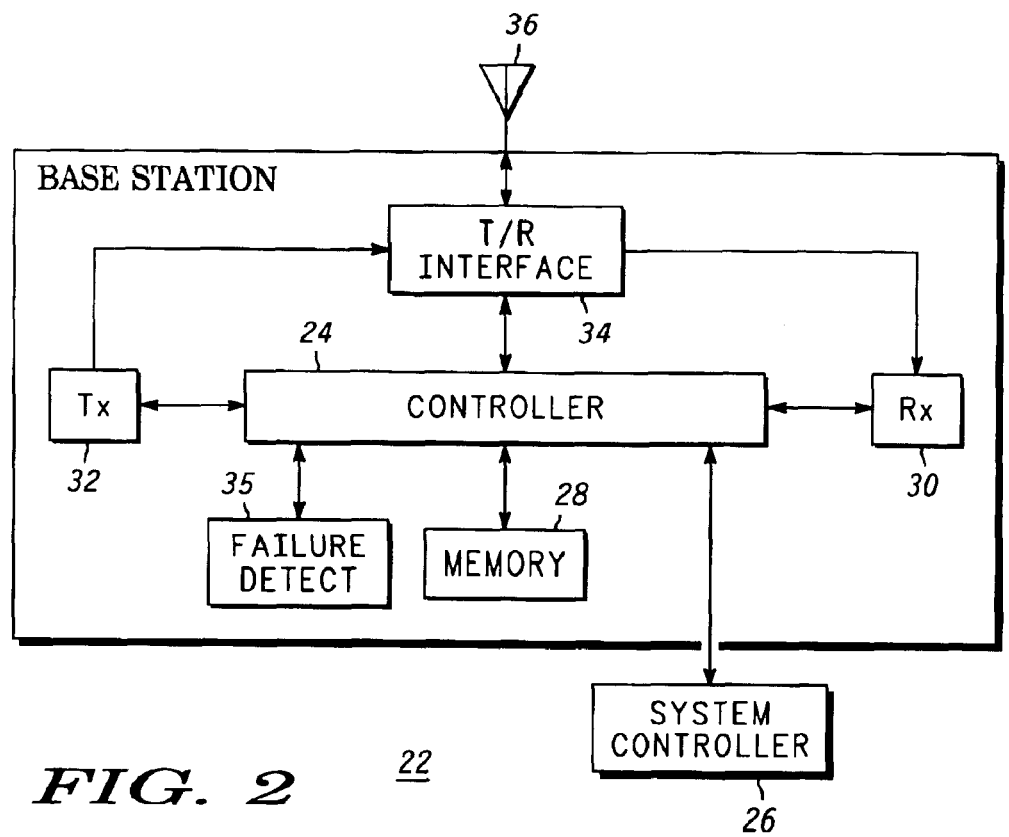
FIG. 2 illustrates a block diagram of a base station in the communication system of FIG. 1.

Referring to FIG. 2, a general block diagram of a base station 22 is shown. The diagram is shown generally to encompass both the main or the backup base stations 16 and 20 of FIG. 1, even though under the present invention, the main and backup base stations 16 and 20 can have different communication capacities, for example, in terms of number of supported RF channels, communication speed or required AC supply power, etc. The base station 22 operates under the control of a base station controller 24, which receives and responds to instructions or commands received from a system controller 26. For providing operational control, the controller 24 executes a suitably developed application program that is stored in a memory 28. Based on the received instructions from the system controller 26, the controller 24 operates one or more transceivers supporting inbound and outbound traffic and control channels.

In a transmit mode, controller 24 applies modulation and amplification techniques for preparing a communication signal to be transmitted by a transmitter 32 over the outbound channels. The modulated amplified communication signal is then radiated via an antenna 36 through a TX/RX interface 34 that facilitates duplex communication under the control of the controller 24. The antenna 36 can be any one of an antenna known to those skilled in the art, for example, a monopole antenna. In a receive mode, the base station receives electromagnetic radiation from the communication devices 12 at the antenna 36 over inbound communication channels. The received electromagnetic is demodulated at a receiver 30 which is coupled to the TR/RX interface 34.

The base station 22 also includes failure detection circuitry 35 that upon detection of a failure transmits a failure signal to the controller 24. Failure detection is known and will vary from device to device. Normally failure circuitry will be monitored in major functional area such as power supply, transmitter, receiver, etc., but has been depicted here as a separate entity for the sake of clarity. The controller 24 in response to the failure signal, transmits an appropriate message to the system controller 26, informing it of a system failure. As described in connection with FIG. 1, once a failure condition is detected, the main system controller 16 switches from the main base station 14 to the backup base station 20. Of course, the system controller 26 can detect a fault condition on its own, for example, if a response to a polling request transmitted by the system controller is not received from the base station 22 within a predefined period of time.

Figure 3:
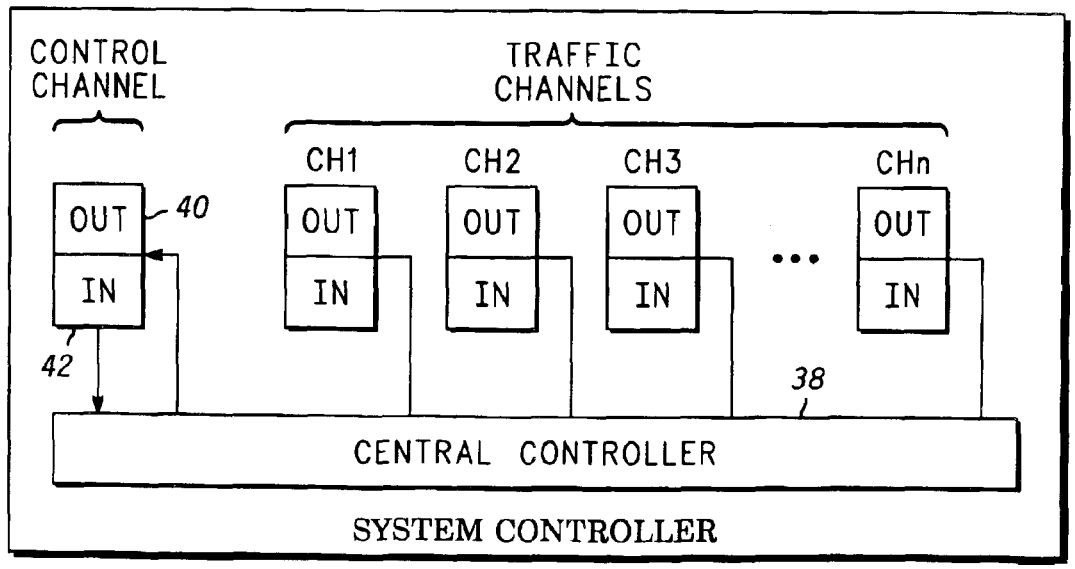
FIG. 3 illustrates a block diagram of a system controller in the communication system of FIG. 1.

Referring to FIG. 3, the system controller 26 includes a central controller 38 that controls a plurality communication resources, such as inbound and outbound communication links to one or more base stations similar to the one described in FIG. 2. As shown, the communication protocol on the control channel is predefined based on the requirement of the communication system 10. Based on availability, the system controller 26 allocates an outbound control channel 40 for transmission of outbound signaling words (OSW) in accordance with the communication protocol., The system controller 26 also receives inbound signaling words (ISW) on an inbound control channel 42. Under an exemplary embodiment, each OSW is 84 bits long and is transmitted at 3600 baud during a 23 ms time interval. Each ISW is 78 bits long also having a 3600 baud rate. Bit pattern of the ISWs and the OSWs are defined by the communication protocol requirements so as to communicate the control information that enables orderly communication with the communication devices 12.

Operationally, when the system 10 is in an idle state, i.e., no communication is in progress, the communication devices 12 monitor the outbound control channel for background data OSWs that are periodically transmitted. The system controller 26 also monitors the availability of other voice channels. The background OSWs contains such information as system identification and channel identification, which, among other things, inform the communication devices 12 of their fleets and channel assignments to that fleet. The OSWs also provide synchronization among the communication devices 12. Portions of the OSW bit stream are designated to provide both bit and word synchronization among the communication devices 12 and the main system controller 26.

When a call is initiated, communication devices 12 enter into transmit mode to transmit a channel access ISW. The communication devices 12 transmit a first channel access ISW, on the inbound control channel. The channel access ISW comprises information, such as fleet ID, unit ID, etc. Transmission of the first channel access ISW indicates that a communication device 12 is attempting to access service. If the system controller 26 receives the channel access request ISW, it searches all the available traffic channels and upon availability, allocates a traffic channel to the communication device 12. If an available channel is found, a channel grant OSW is transmitted to the communication device 12, and if an available channel is not found a channel busy OSW is transmitted. The channel grant OSW indicates the channel number of the allocated traffic channel to all of the communication devices 12 operating within the communication system 10. Upon reception of a valid OSW (i.e., channel grant or busy), the initiated call is processed. When a call is being processed, all the communication devices 12 which have the same fleet or sub-fleet number as the originating communication device 12 revert to the allocated traffic channel to carry on with the call.

As stated above, the communication devices 12 are differentiated by an associated classes of service. The communication devices 12 that qualify for or subscribe to the first class of service can be emergency vehicles, for example, fire trucks, ambulances, and police cars. Such communication devices 12 correspond to a high service priority relative to the second class of service. The second class of service is reserved for non-emergency services, for example; waste management systems, public transportation, and private infrastructures. Communication devices 12 that subscribe to the second class of service are subject to a low service priority. For example, in the event of faulty operating communications, devices 12 that subscribe to the first class of service continue normal communication, whereas the communication devices 12 that subscribe to the second class of service can and may experience communication failure.

The system components differentiate between the classes of service to which the communication devices are subscribed. The communication devices themselves can inform the system of their class. Alternatively, the system component can retrieve subscription class information from a system database, such as an Home Location Register or a Visitor Location Register, which contains the services to which each communication device is subscribed. The component may store this information locally for ease of access. For example, a base station may maintain a copy of the information in local storage so that when parts of the system go down, the queries of the database that are needed to distinguish the different classes of communication devices do not create excessive network traffic.

Figure 4:
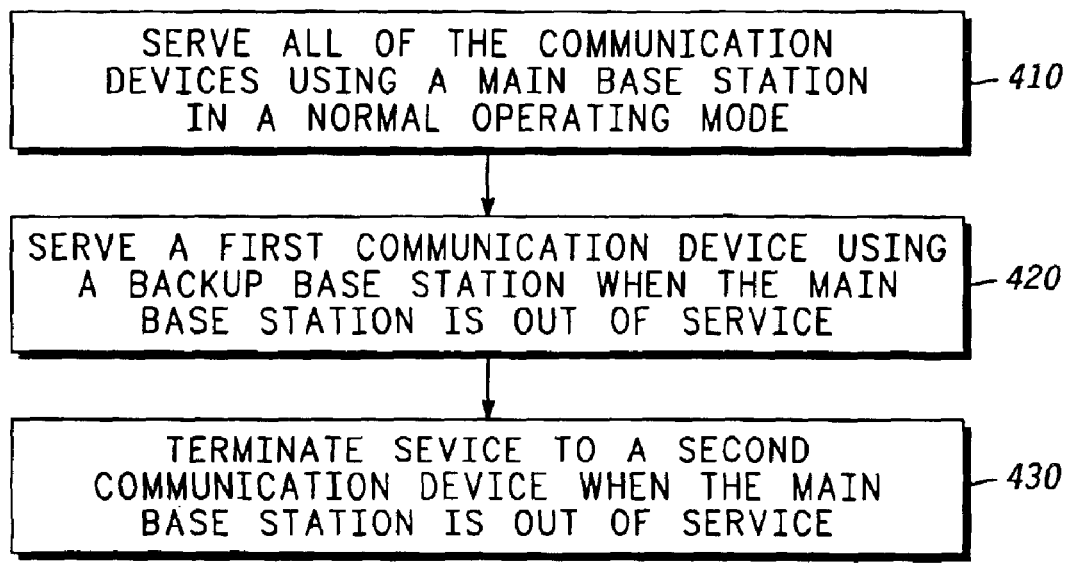
FIG. 4 illustrates a flowchart of a method for providing communication services in accordance with the present invention.

Referring to FIG. 4, a flowchart for a method of servicing high priority communication devices 12 when the main base station 14 is out of service is shown. The main base station 14 serves all of the communication devices 12 in the normal operating mode, block 410. In the event the main base station 14 goes out of service, for example, for maintenance or component failure, the backup base station 20 is brought into and provides service to the communication devices 12. In this case, the backup base station 20 is limited to servicing communication devices 12 that subscribe to the first class of service. Therefore, at block 414, service to communication devices 12 that subscribe to the second class of service is terminated or denied upon request.

From the foregoing description it would be appreciated that the present invention provides a method for providing reliable communication services to prioritized communication devices operating in a communication system. It would be further appreciated that the present invention provides a reliable communication service to communication devices at a reasonable cost by reducing the capacity and hardware in the backup infrastructure.

The invention has been described in detail with respect to preferred embodiments, and it will now be apparent from the foregoing to those skilled in the art that changes and modifications can be made without departing from the invention in its broader aspects, and the invention, therefore, as defined in the claims is intended to cover all such changes and modifications as fall within the true spirit of the invention.

What is claimed is:

1. A communication system that provides backup wireless communication services, comprising:
   a plurality of communication devices that include at least one first communication device subscribed to a first class of service and at least one second communication device subscribed to a second class of service;
   a database including subscription information of the at least one first communication device and the at least one second communication device;
   a main system component that normally serves all of the plurality of the communication devices; and
   a backup system component for the main system component that, in response to the main system component going out of service, operates to:
      obtain subscription information from the database for a particular communication device needing service;
      provide service to the particular communication device needing service if the subscription information indicates that the particular communication device subscribes to the first class of service; and terminate service to the particular communication device needing service if the subscription information indicates that the particular communication device subscribes to the second class of service.

2. The communication system of claim 1, wherein the first class of service has a higher service priority relative to the second class of service.

3. The communication system of claim 2, wherein the first class of service corresponds to an emergency service and the second class of service corresponds to a non-emergency service.

4. The communication system of claim 1, wherein the main system component is a main base station and the backup system component is a backup base station.

5. The communication system of claim 1, wherein the backup system component has a lower capacity than the main system component for substantially same coverage area.

6. The communication system of claim 1, wherein the backup system has a higher reliability than the main system component.

7. The communication system of claim 1, wherein information about the class of service for each communication device is stored in the system.

8. The communication system of claim 1, wherein the at least one communication device informs the system relative to a subscribed class of service.

9. The communication system of claim 1, wherein the plurality of communication devices, the at least one first communication device, and the at least one second communication device are mobile communication devices.

10. A method for providing wireless communication services to a plurality of communication devices, wherein the plurality of communication devices include at least one first communication device subscribed to a first class of service and at least one second communication device subscribed to a second class of service, comprising:

normally serving all of the plurality of the communication devices using a main system component;

providing service to a particular communication device by a backup system component in response to the main system component going out of service, if the particular communication device subscribes to the first class of service;

accessing a database including subscription information of the at least one first communication device and the at least second communication device; and terminating service to the particular communication device, in response to the main system component going out of service, if the particular communication device subscribes to the second class of service.

11. The method of claim 10, wherein the backup system component only serves the at least one first communication device subscribed to the first class of service, when the main system component goes out of service.

12. The method of claim 10, wherein the first class of service has a higher service priority relative to the second class of service.

13. The method of claim 10, wherein the main system component is a main base station and the backup system component is a backup base station.

14. The method of claim 10, wherein the backup system component has a lower capacity than the main system component for substantially same coverage area.

15. The method of claim 10, wherein the backup system has a higher reliability than the main system component.

16. The method of claim 10, wherein the plurality of communication devices, the at least one first communication device, and the at least one second communication device are mobile communication devices.

* * * * *